Nov. 15, 1960

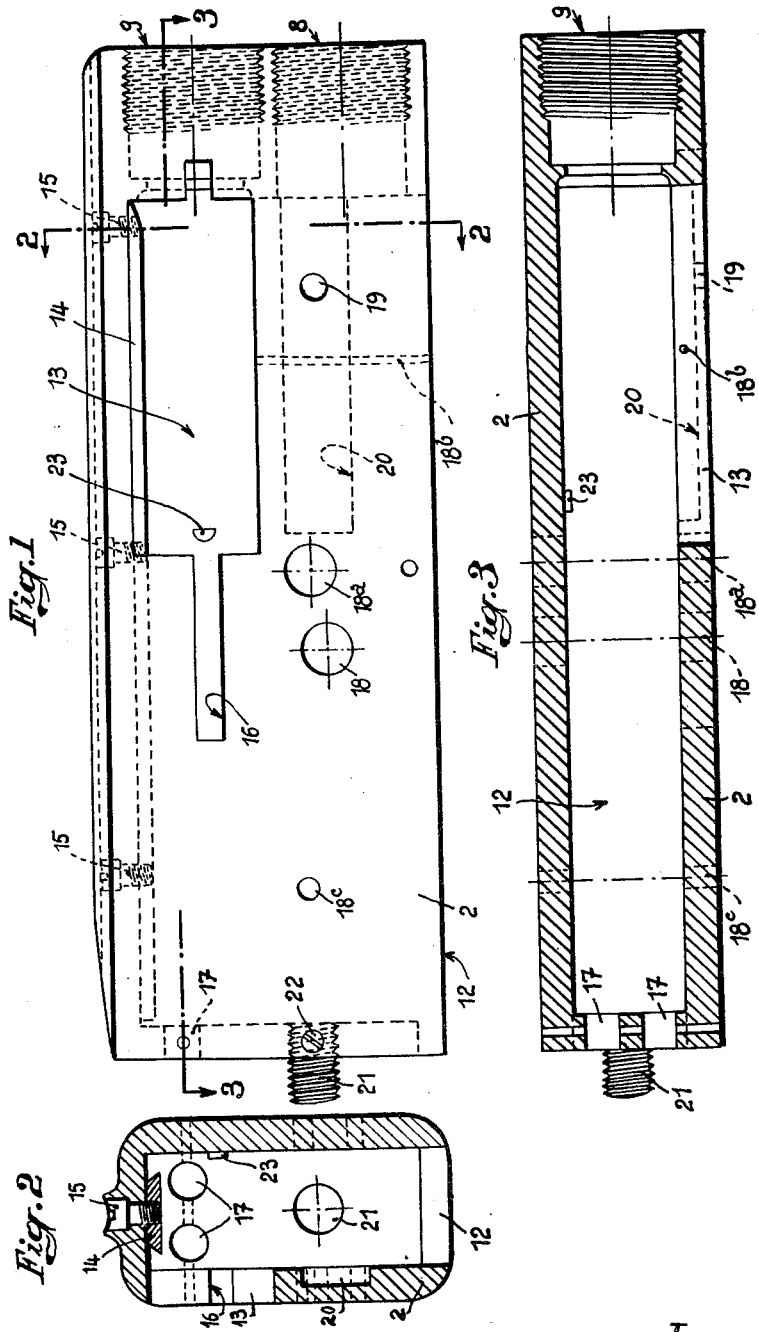

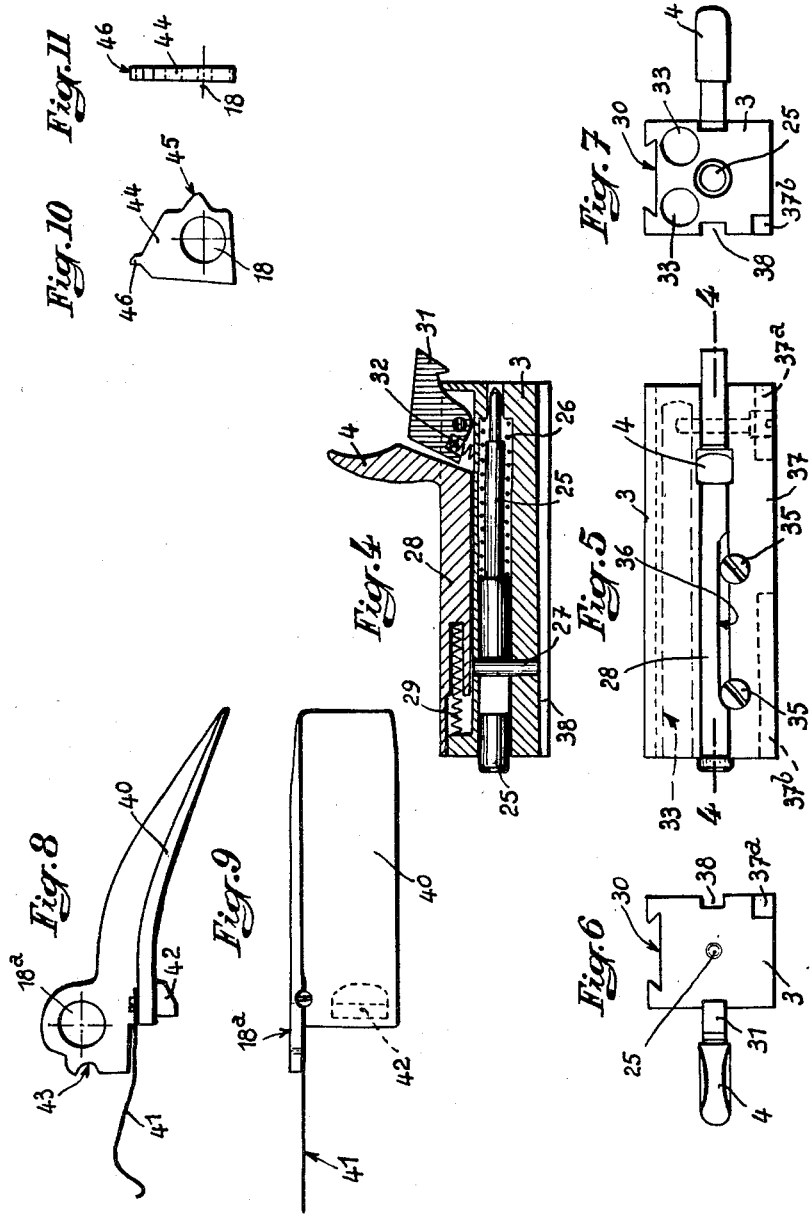

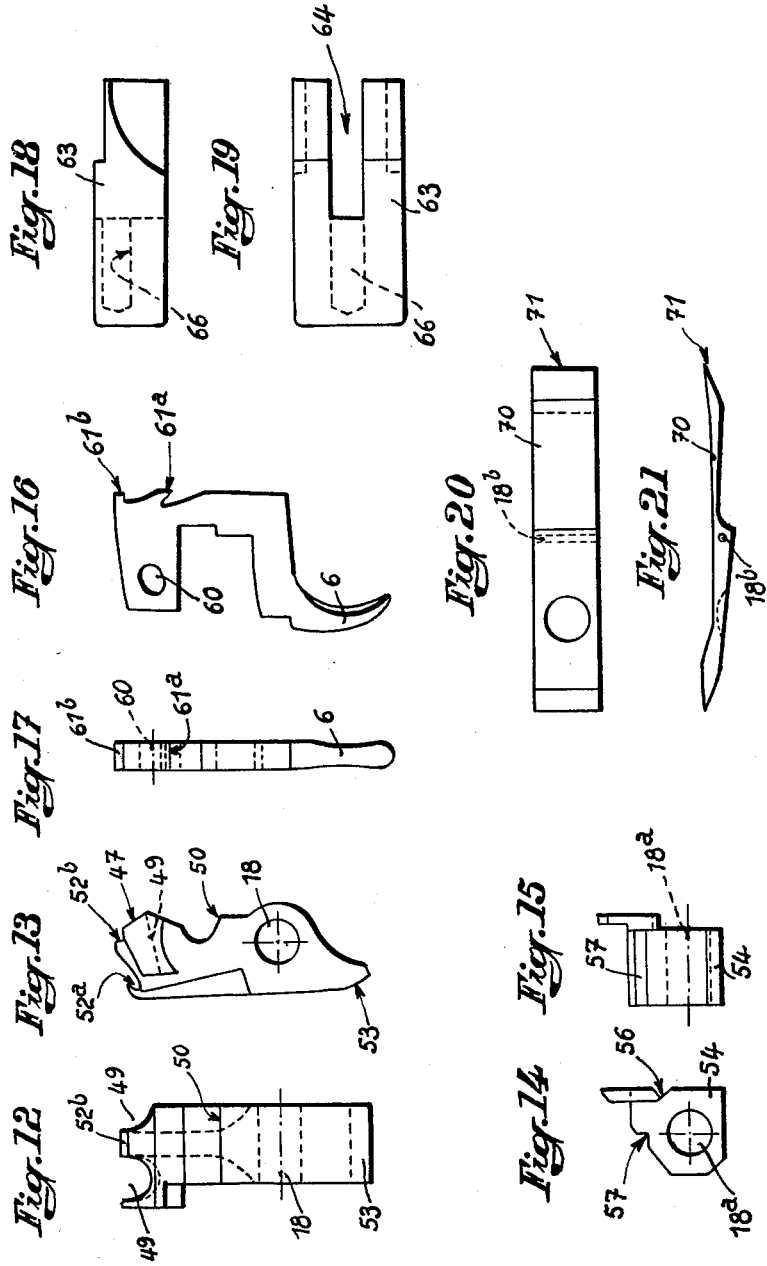

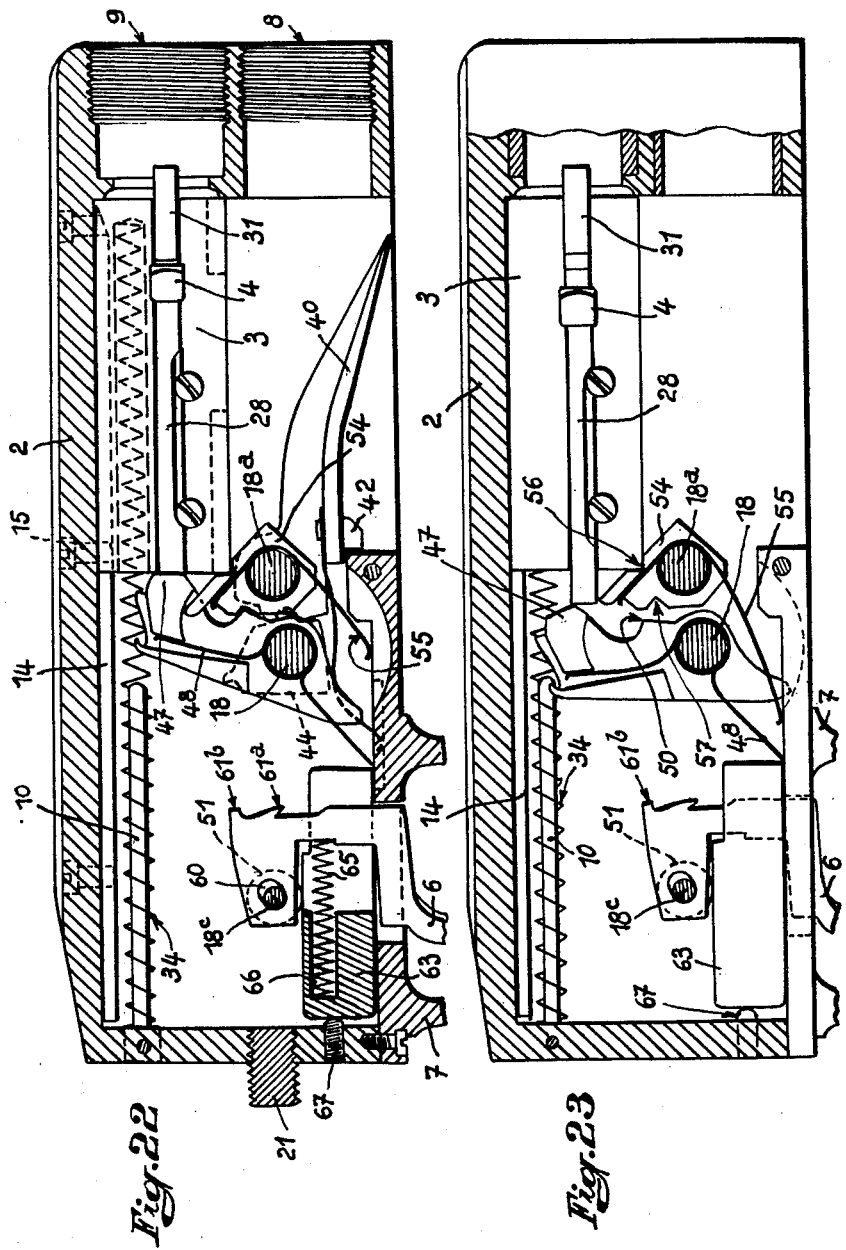

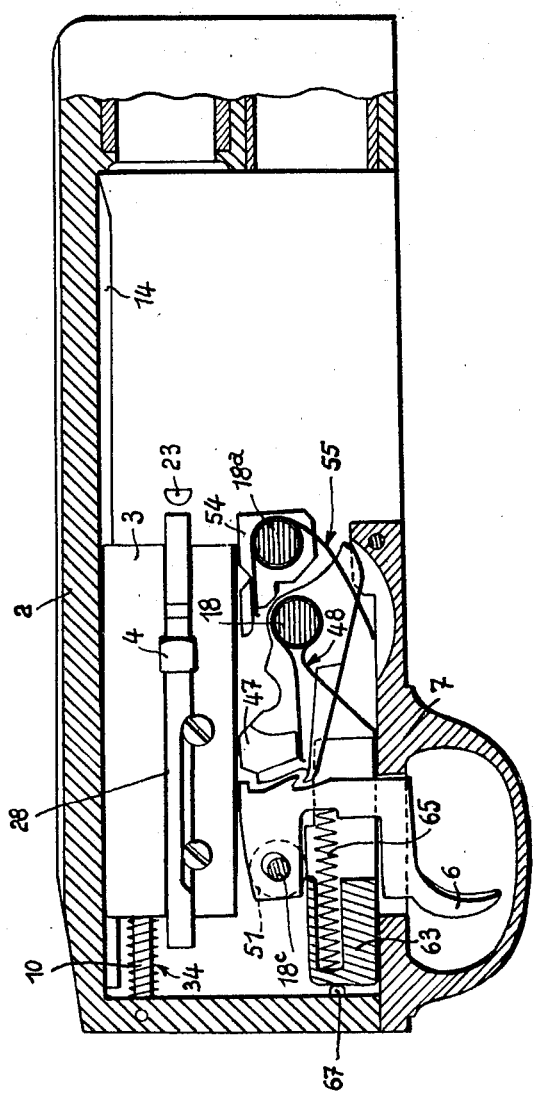
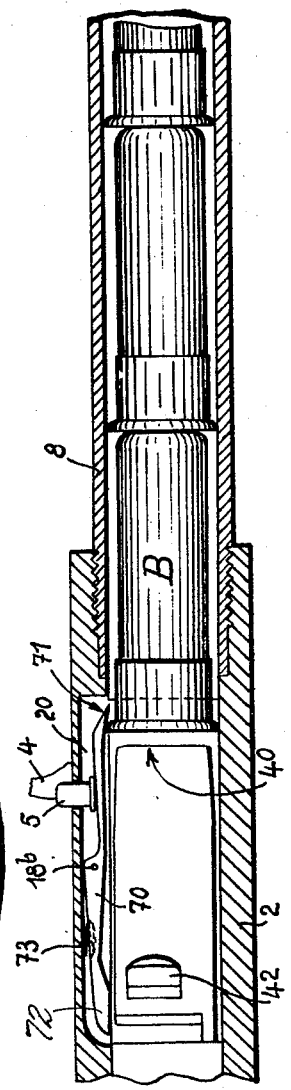
Fig. 24
Fig. 25
Inventor:
RENÉ JEAN GEORGES BRETTON

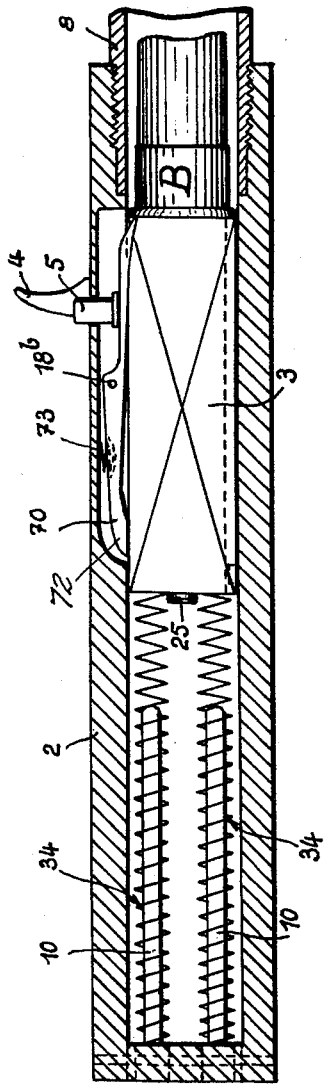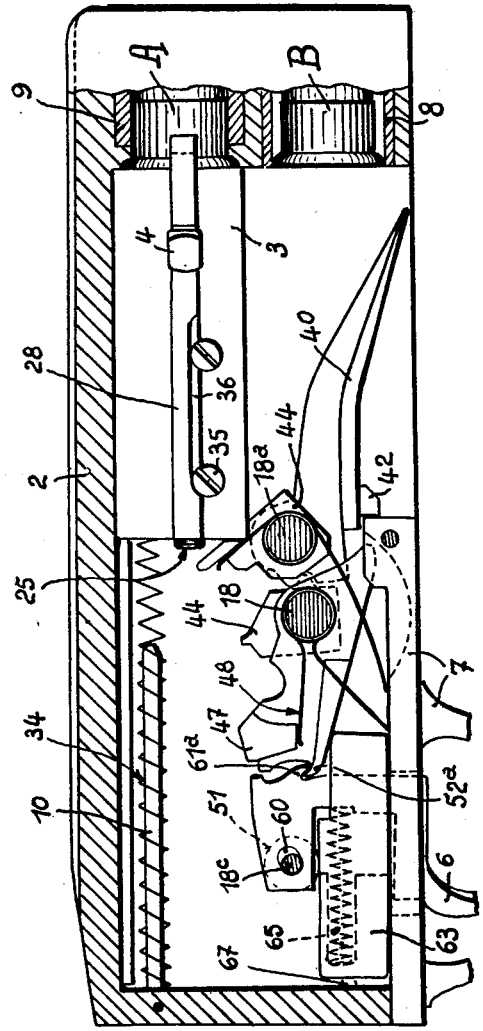

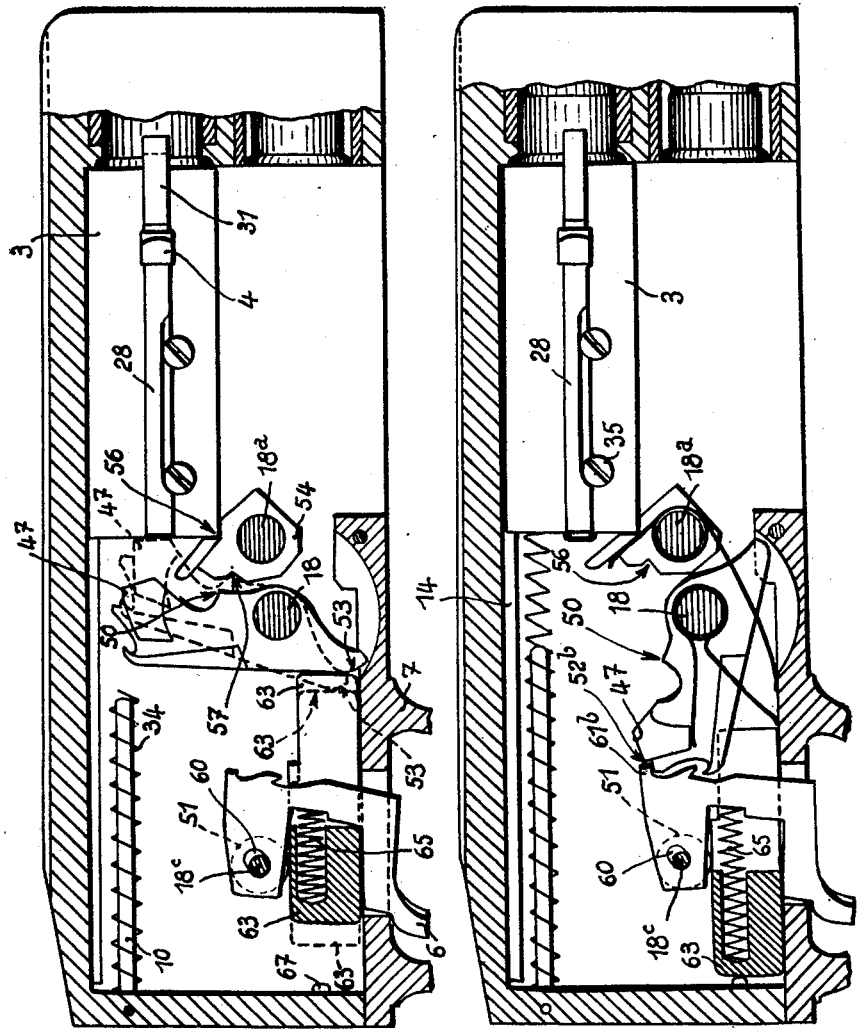

R. J. G. BRETTON 2,960,011

AUTOMATIC FIREARM HAVING INERTIA
RELEASED BREECH MECHANISM

Filed April 18, 1957

Inventor:
RENÉ JEAN GEORGES BRETTON
by
Richardson, Davis and Norden
Att'ys

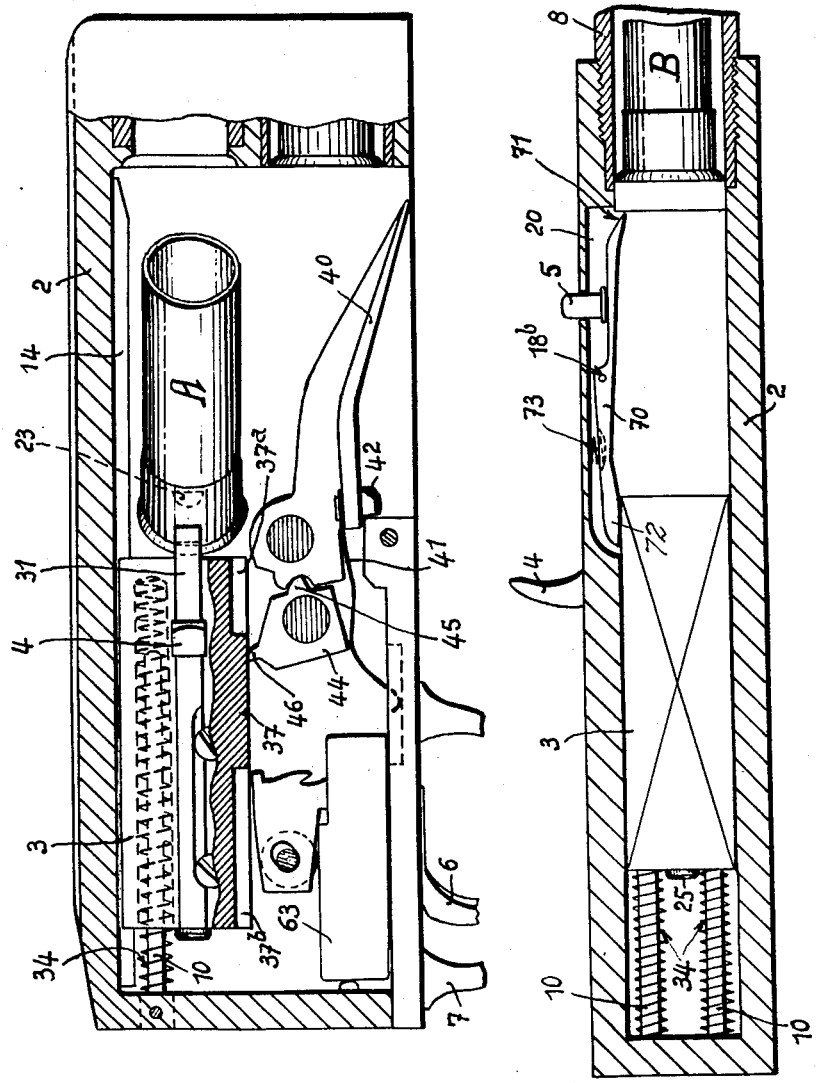

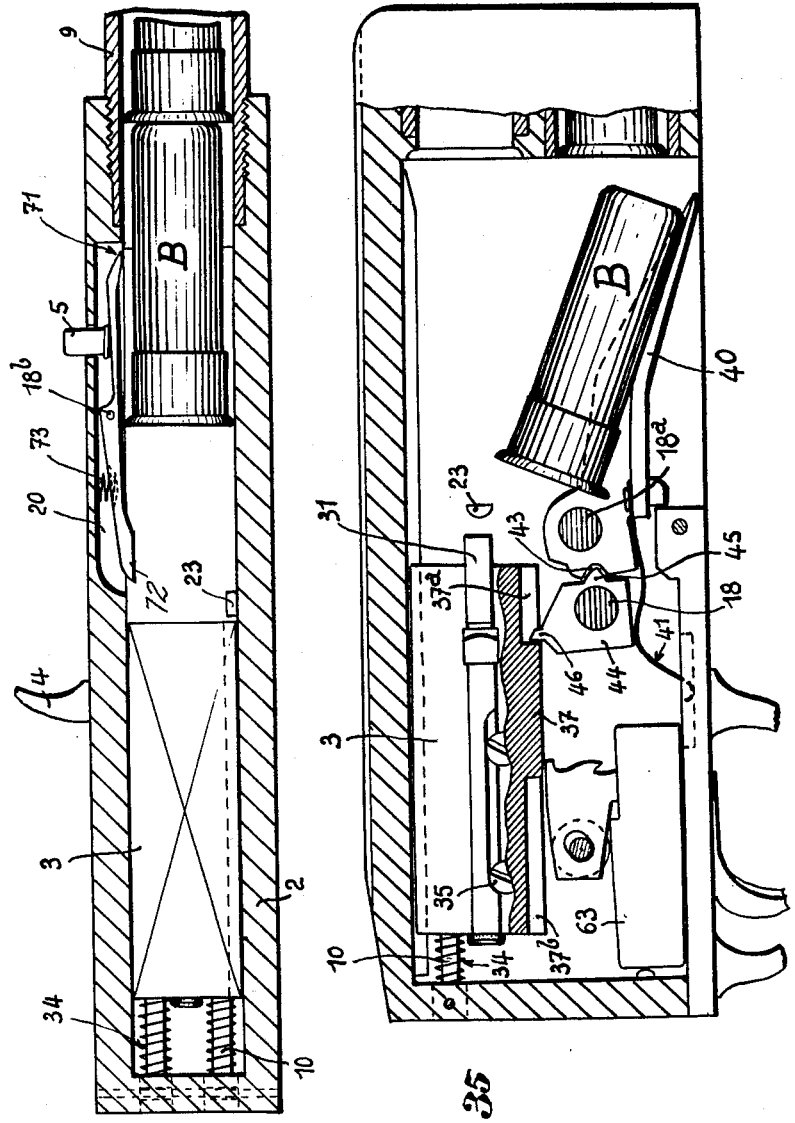

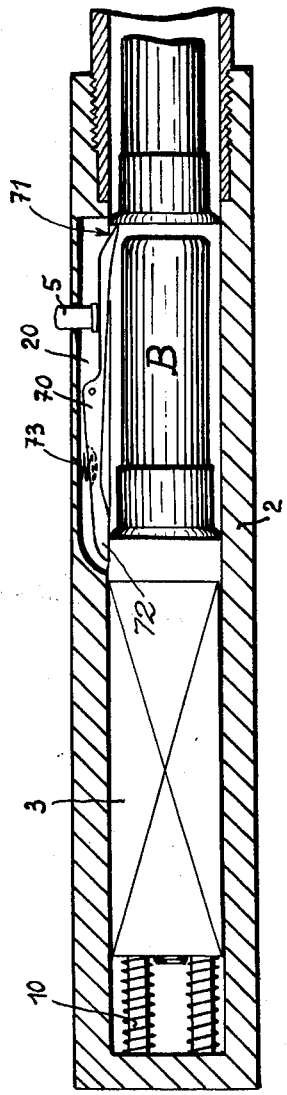
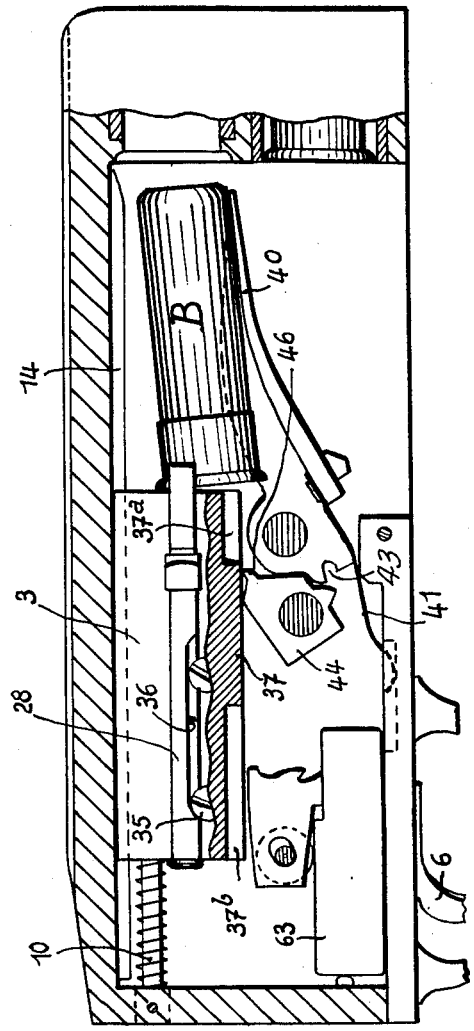

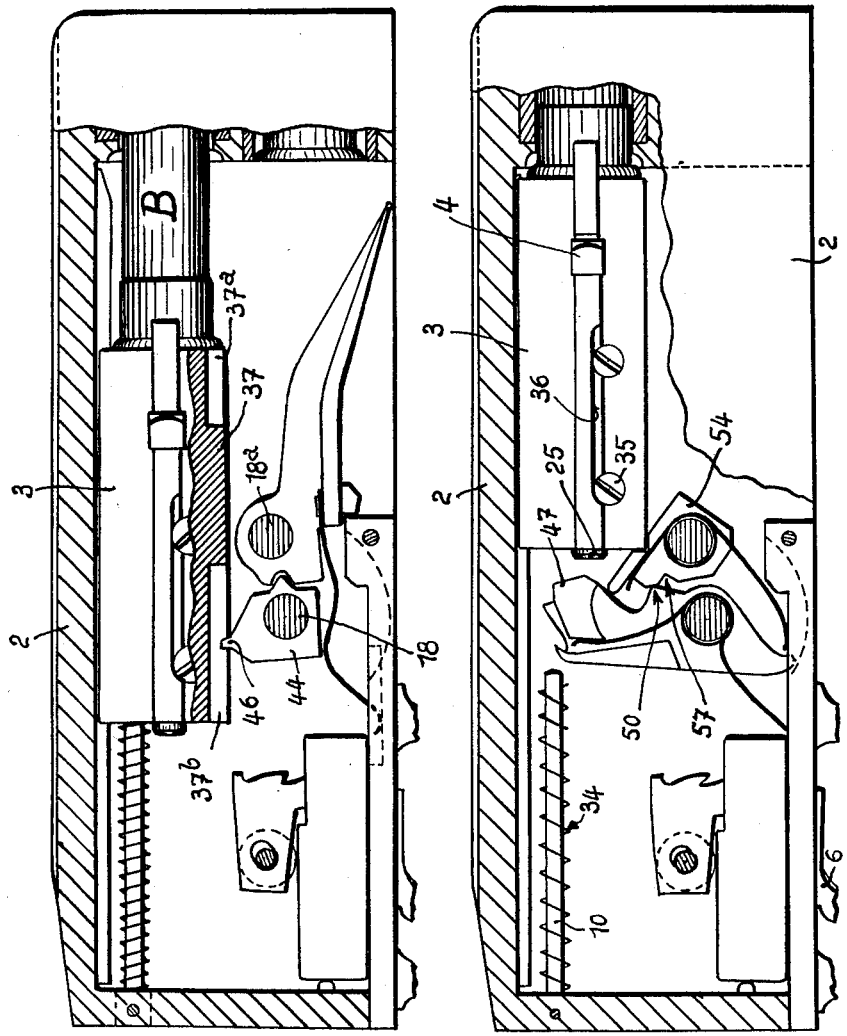

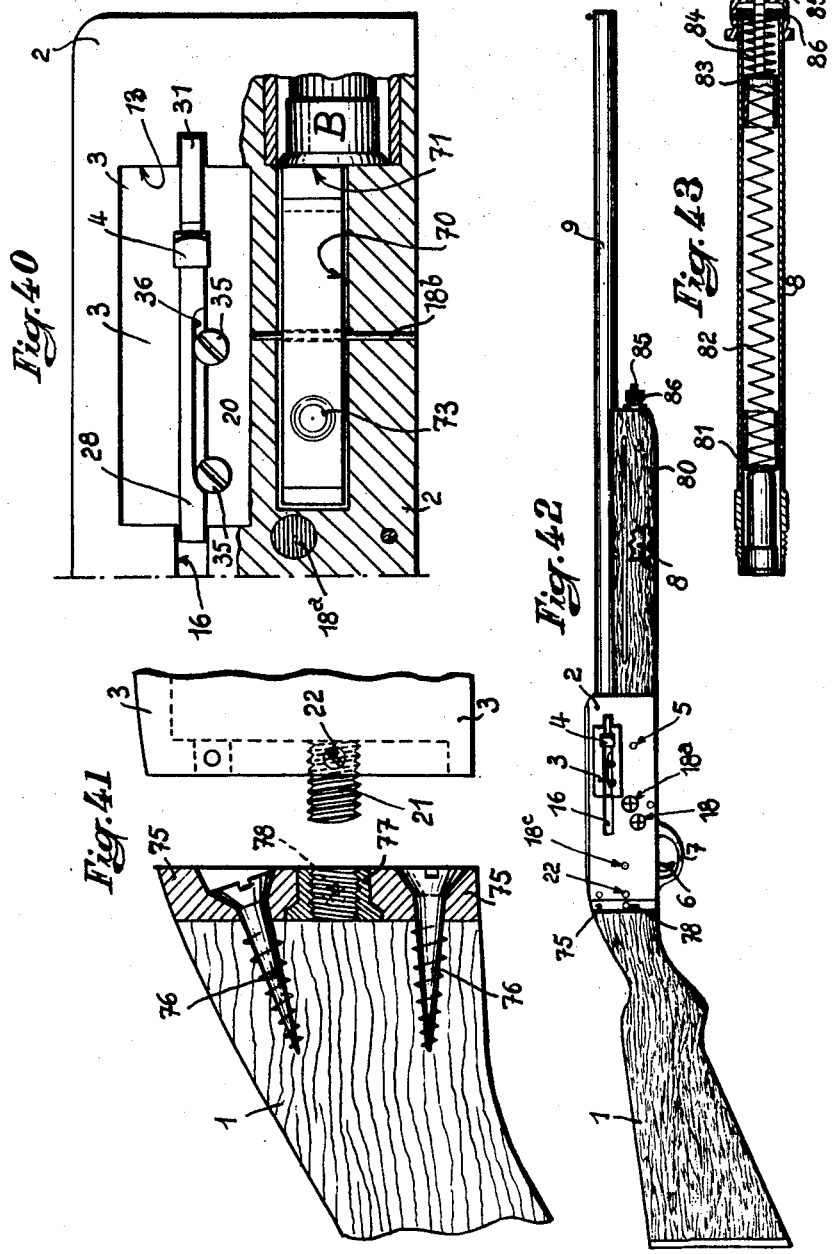

2,960,011

AUTOMATIC FIREARM HAVING INERTIA RELEASED BREECH MECHANISM

René Jean Georges Bretton, 26 rue Alexandre Pourcel, Saint-Etienne, France

Filed Apr. 18, 1957, Ser. No. 653,648

Claims priority, application France May 7, 1956

3 Claims. (Cl. 89—182)

My invention has for its object a fire-arm providing for the automatic loading and ejection of the ammunition. Its novelty resides both in its operation and in various embodiments thereof.

My improved fire-arm is of the category of semi-automatic fire-arms of the short recoil type. In such fire-arms, the release of the breech block is generally controlled, at the desired moment, i.e. when the missile has just flown past the muzzle of the gun barrel and the pressure inside the latter has sunk, by the sliding of the unit including the barrel and the breech block with reference to the remainder of the fire-arm constituted by the receiver and the butt, said comparatively short sliding movement of a magnitude of one to three centimeters being braked by a powerful antagonistic spring.

My improved fire-arm is chiefly characterized by the fact that the section of the fire-arm subjected to a recoil movement and which controls the release is constituted by the entire gun except for a small inertia block which is housed inside the receiver and slides freely inside the latter, which inertia block controls at the desired moment the release of the breech block through a relative sliding due to its inertia and which allows it to remain stationary in space at the moment of the recoil of the fire-arm against the shoulder of the marksman.

It should be remarked that this novel manner of operating automatic guns is quite distinct from that of the fire-arms of the so-called inertia type wherein a mass stores at the moment of the recoil of the gun some energy which is restored at the end of this recoil movement so as to allow the breech block to be released and to continue its rearward motion to provide for the ejection of the spent cartridge and the following automatic operative steps.

The modus operandi disclosed hereinabove and forming the object of my invention bestows the fire-arm incorporating such an automatic system with numerous advantages and in particular that of a highly uniform operation whatever may be the grade of the ammunition used. As a matter of fact, the recoil is applied to the entire fire-arm except for the inertia block the weight of which is very small with reference to the weight of the entire fire-arm, and the amplitude and speed of sliding providing for the release are consequently no longer controlled by a spring the power of which was hitherto used to make up for the low inertia of the unit including only the barrel and the breech block. Now this power increases to a considerable extent when said unit including the barrel and the breech block recoils and compresses the spring so that if the ammunition used produces a recoil which is slightly shorter than that which is normally provided for equilibrium through the deformation of the spring, the sliding of this barrel and breech block unit cannot be obtained completely and within the time required so as to allow the subsequent release and the succeeding operative steps.

In contradistinction, in accordance with the improved operation of my fire-arm, the recoiling means are constituted by the entire fire-arm and the power delaying the sliding movement is constant and independent of the amplitude and speed of recoil, since said power is produced merely by the inertia of the fire-arm.

Now, experience shows that when the charge enclosed in the ammunition suiting a fire-arm leaves the muzzle of the barrel, the fire-arm has recoiled only by a fraction of the total amplitude of its recoiling movement and that a comparatively large modification in the pressure imparted by the ammunition corresponds only to an extremely small modification of the amplitude of the recoil at such a moment.

It is therefore sufficient, in accordance with my invention, to suitably adjust the distance separating the inertia block from its point of contact with the releasing means so as to reliably obtain a control of this release in proper time, i.e. when the missile is still in the vicinity of the barrel muzzle and when inside the barrel the pressure has dropped sufficiently for cooperating in urging smoothly the breech block towards the rear.

My invention is applicable to all automatic fire-arms whether war, drilling or sporting guns. It covers also a number of advantageous features and in particular as follows:

(a) the striking hammer acts also as a bolt, which provides a considerable simplicity together with perfect reliability in operation since the striking can be obtained only when the breech plug has returned completely into its starting position.

(b) the bolt for the breech block is constituted by the striking hammer and by an intermediate bolt fitted between said plug and said hammer, which cuts out any risk of wedging or jamming as might occur in the case of any play arising between the breech block and its slide-way if the locking were ensured through a direct impact of the hammer on the breech block.

(c) the breech block slides over a slide-way fitted in the upper part of the housing formed by the receiver and consequently said breech block is independent of the receiver and it is possible to make the latter of a light alloy or the like material having a low mechanical resistance since there is no risk of the receiver wearing through friction. On the other hand, the slide-way being positioned at the upper end of the receiver can less easily be reached by any residue of powder or particles of earth which might otherwise form a deposit on it.

(d) the automatic feeding of ammunition from a magazine resorts to the inertia of the ammunition at the moment of the recoil of the fire-arm so as to allow the free operation of an abutment, said arrangement allowing the filling and emptying of the magazine without any preliminary operation of any further member and without it being necessary to operate the breech block for the feeding of each cartridge. This arrangement allows furthermore changing rapidly the cartridge which is housed inside the barrel without it being necessary to cut out the automatic feeding of the magazine through a temporary locking, while the marksman may forget to release said transient locking so as to restore the automatic feeding of the magazine.

(e) the trigger tumbler is provided with an oval opening engaging the striking hammer which acts in its turn as a bolt and it is provided with a double notch for holding the hammer in its set position even if the marksman has not released the trigger tumbler engaged by his finger.

(f) the design of the receiver is such that no member of the mechanism extends into the butt and it may be removed so as to on the one hand further the application of the butt against the shoulder of the marksman while on the other hand, this makes the dismantling of the butt easier with a view to reducing the bulk of the gun lengthwise.

(g) the cartridge magazine of the conventional type is completed by a piston which is elastically balanced and the rod of which carries a scale and projects forwardly so as to show on said scale the number of cartridges positioned or remaining inside said magazine.

My invention will be better understood from a reading of the following disclosure, reference being had to the accompanying drawings illustrating by way of exemplification a sporting gun. In said drawings:

Fig. 1 is an elevational view of a receiver seen from the side out of which the spent cartridges are ejected.

Figs. 2 and 3 are sectional views of said receiver respectively in transverse cross-section through line 2—2 of Fig. 1 and in longitudinal cross-section through line 3—3 of Fig. 1.

Fig. 4 shows the sliding breech block seen in longitudinal sectional view through line 4—4 of Fig. 5.

Fig. 5 is a plan view of said breech block.

Figs. 6 and 7 are views of the sliding breech block seen respectively from the front and from the rear.

Figs. 8 and 9 show a cartridge conveyor blade respectively in side elevational and in plan view.

Figs. 10 and 11 are front and side views respectively of the rocking member controlling the conveyor blade.

Figs. 12 and 13 are elevational and side views of the hammer adapted to act as a bolt.

Figs. 14 and 15 are side and front views of a sear.

Figs. 16 and 17 are front and end views of the trigger forming also the tumbler.

Figs. 18 and 19 show the inertia block respectively in side elevational view and in view from above.

Figs. 20 and 21 show respectively in side elevational view and in view from above the stop member for the conveyor.

Fig. 22 illustrates the mechanism as a whole in its released position carrying no cartridge either in the barrel or in the magazine.

Fig. 23 illustrates the gun when unloaded in its hand-controlled released position.

Fig. 24 illustrates the continuation of the recoil movement which produces the setting of the gun.

Fig. 25 illustrates the loading of the magazine.

Fig. 26 is a view from underneath of the locking means for the stop member, as provided by the breech block which provides thus for a holding fast of the cartridges inside the magazine.

Fig. 27 shows the gun in its cocked position.

Fig. 28 illustrates the release of the sear constituted by the hammer through the inertia of the inertia block at the beginning of the recoil movement.

Fig. 29 illustrates the automatic cocking after the return movement of the sliding breech plug, the marksman's finger remaining on the trigger.

Figs. 30 to 36 illustrate the successive stages of the extraction of the spent cartridge and also the first stages of the feeding of a fresh cartride from the magazine.

Fig. 37 and 38 illustrate the end of the cartridge feeding cycle.

Fig. 39 shows how a deformed cartridge is prevented from completely engaging the gun barrel.

Fig. 40 is a lateral elevational view of a portion of the receiver, partly sectional so as to show the stop member in its housing.

Fig. 41 illustrates a detail of the removable fitting of the receiver on the butt.

Fig. 42 is a general view of the assembled gun.

Figures 30, 31:
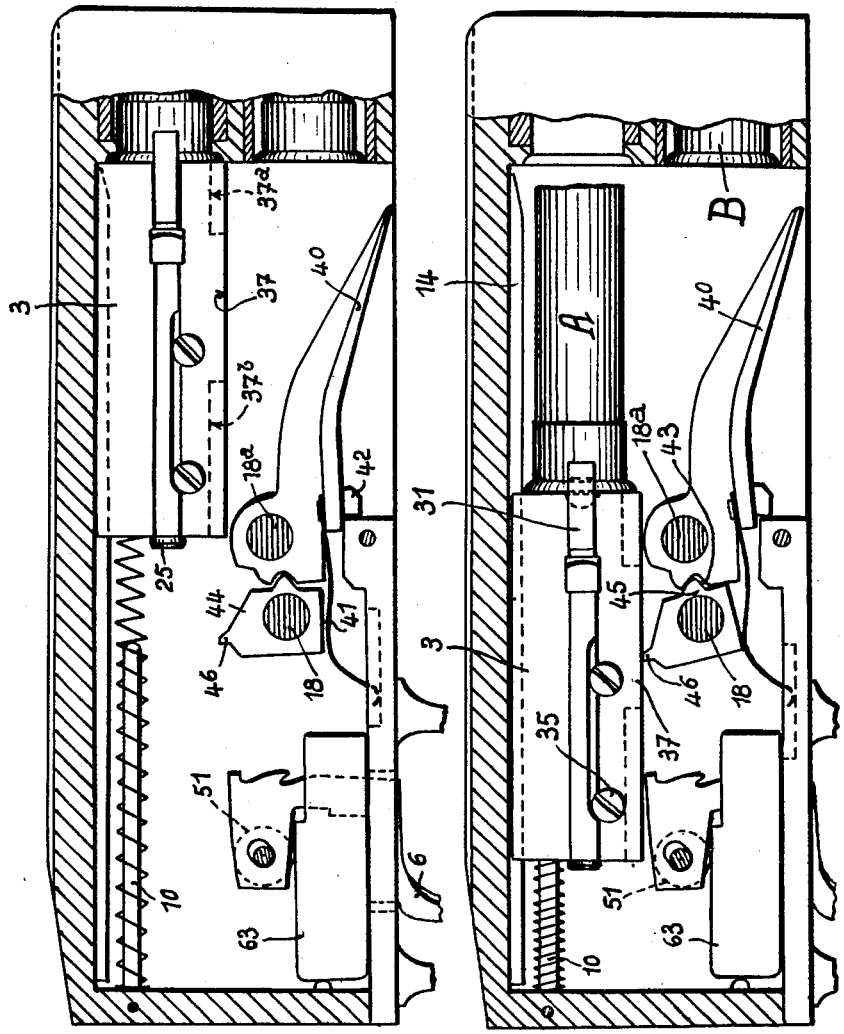

Lastly, Fig. 43 is a longitudinal sectional view of the cartridge magazine with its cartridge counting means.

The gun when seen from the outside as shown in Fig. 42 includes a butt 1 with a receiver 2, the breech block 3 carrying its hand-controlled operative lever 4, its push button 5 releasing said breech block, its trigger 6 with its trigger guard, its cartridge magazine 8 and its barrel 9.

The receiver 2 illustrated in detail in Figs. 1 to 3 is provided with a lower opening 12, with a lateral opening 13 and with a lateral slot 16 opening into the latter and along which the lever 4 may slide.

The receiver is also provided with recesses for holding the barrel 9 and the magazine 8 and with two longitudinal bores 17 carrying each a rod 10, as shown in Fig. 22.

The receiver is also provided with openings for the passage therethrough of spindles or pins 18, 18a, 18b, 18c carrying members to be pivotally secured to the receiver, with an opening 19 for the passage of the push member 5.

A recess 20 is also provided for the stop member described hereinafter, a stop 23 for the ejection of the cartridge and lastly in its rear section a threaded plug 21 is held against rotation by a set screw 22.

The breech block 3 (Figs. 4 to 7) sliding inside said receiver includes chiefly a striker 25 with its return spring 26 and the stop 27 limiting its travel. Said breech block is associated with a sliding rod 28 provided with a hand-controlled lever 4 subjected to the returning action of the spring 29, a dove-tailed groove and rabbet joint 30 allowing said breech block to be slidingly suspended from the small rail 14 on the receiver 2. A pivotally secured cartridge extractor 31 is urged back into position by the spring 32. Two bores 33 registering with the heads of the rods 10 in the receiver carry springs 34 urging the breech block forwardly (Fig. 22).

Two screws 35 engage a notch 36 in the rod 28 so as to limit the shifting of the latter in either direction and they serve also as retaining members.

Along one of its side walls, the breech block is provided with two recesses 37a and 37b separated from each other by a solid section 37 and it is also provided throughout its length with a groove 38 for the passage therein of the stop 23.

A blade 40 (Figs. 8 and 9) acting as a cartridge conveyor is urged back by the spring 41 and carries a stop 42 limiting its rocking movement, said blade conveyor which is also provided with a driving notch 43 being pivotally mounted upon the spindle 18a of the receiver and moving inside the latter in registry with the lower opening 12 of the latter.

A rocking member 44 (Figs. 10 and 11) is provided with a nose 45 meshing with the notch 43 of the conveyor and a nose 46, said rocking member being pivotally secured so as to revolve round the spindle 18 extending through the corresponding opening in the receiver.

A striking hammer illustrated in Figs. 12 and 13 is controlled by a spring 48 (Fig. 22) and is also pivoted upon the spindle 18, said hammer being recessed at 49 so as not to be disturbed in its movements by the rods 10 and their springs 34.

Said striking hammer is also provided with a notch 50, a pair of associated notches 52a and 52b and terminating with a tail-piece 53.

An intermediate bolt or sear 54 (Figs. 14 and 15) is pivotally mounted upon the spindle 18a extending through an opening of the receiver and is subjected to the action of a return spring 55 (Fig. 22); said sear 54 is provided with a notch 56 for engaging the breech block 3 and with a notch 57 for engagement with the notch 50 in the bolt-forming hammer 47.

A trigger 6 illustrated in Figs. 16 and 17 is provided with an oval opening 60 and its carrier spindle extends through the opening 60 in the receiver, the trigger being provided with two notches 61a and 61b.

An inertia block 63 (Figs. 18 and 19) is provided with a notch 64 encompassing the trigger 6 which forms thus a guiding element for it, said inertia block being guided between the bottom of the receiver and the roller 51 and being adapted to slide between same freely in a longitudinal direction against the thrust exerted by the spring 65 (Fig. 22) which spring, engaging the recess 66 in the inertia block and the trigger 6, holds said inertia block in contact with an adjustable abutment screw 67 (Fig. 22) positioned in said receiver 2.

A blade 70 (Figs. 20 and 21) forming a stop member is positioned in contacting relationship with one of the side walls of the receiver and is housed inside the recess 20; said stop member 70 is pivotally secured to a spindle passing through the opening 18b of the receiver. It is thinner in its front section so as to be comparatively elastic and it terminates with a sharp ridge 71 bearing against the bottom of the head of the cartridge which is rearmost in the magazine. When the stop member projects through the rear section of the recess 20 into the receiver 2, it lies over the conveyor 40 and prevents the latter from operating. Said member 70 is subjected to the thrust of a light spring 73 which has a tendency to make it occupy said operative position when it is not prevented from doing so by the head of the rearmost cartridge in the magazine (Fig. 34) engaging the member.

As to said magazine 8 illustrated in Figs. 42 and 43, it is housed inside a wooden cover 80 and it includes in the usual manner a cylinder enclosing a piston 81 subjected to the thrust of the spring 82.

The gun including the above parts, its handling and operation are as follows:

It will first be assumed that the gun is cocked and loaded (Fig. 27), a cartridge A being carried inside the gun barrel while cartridges B are housed inside the magazine 8, the rearmost cartridge in the latter being visible in said Fig. 27 at B.

Upon acting on the trigger 6, the hammer 47 is released and under the thrust of its spring 48, it pivots at a high speed round its spindle 18 passing through an opening in the receiver and it enters the position illustrated in Fig. 22. In this position, the notch 50 in the hammer engages the corresponding notch 57 of the sear 54 which is thus held fast against rocking.

Since the sear is now locked, it locks in its turn the breech plug through its notch 56 and simultaneously the hammer hits the striker which fires the gun. The breech block being then locked transmits through the sear and its spindles the recoil movement of the cartridge to the receiver and to the gun as a whole. The inertia block 63 has a tendency to remain in position as the gun as a whole moves rearwardly due to the recoil and abuts against the tail-piece 53 of the hammer 47 which causes the latter to rock rearwardly and to release its notch 50 with reference to the cooperating notch 57 in the sear 54. The breech block is thus released and under the action of its remaining inertia and of the gases contained inside the barrel, it moves rearwardly and causes the sear 54 to rock together with the locking hammer 47 while compressing the cooperating springs 34, which produces: the ejection of the cartridge A (Figs. 30, 31, 32) which has just been fired. The resetting of the gun and the release of a fresh cartridge B from the magazine 8, for its introduction to the front of and into the barrel 9 upon the forward return movement of the breech block 3 which is thus urged forwardly by its return springs 34 (Figs. 33, 34, 35, 36, 37, 38).

It should be remarked that when the breech block 3 has returned into its starting position and even if the marksman leaves his finger a short time on the trigger 6 as a consequence of the high speed of the different movements referred to, the setting of the gun is obtained, the hammer 47 being held in position by its notch 52b which remains engaged by the upper notch 61b on the trigger (Fig. 29). Upon release of the trigger, the spring 48 acting on the hammer releases said interengaging notches 52b—61b and provides for the interengagement of the notches 52a—61a on the hammer and trigger, the trigger being urged forwardly by the spring 65 engaging the latter and the inertia block 63 (Fig. 27) to urge same apart.

It should be remarked that the oval opening 60 in which the trigger 6 is pivotally carried allows, even if the marksman holds his finger on the trigger as referred to and as illustrated in Fig. 29, said trigger to recede at the moment of the rearward movement of the hammer so as to allow its notches 52a—52b to move downwards past the notches 61a—61b on the trigger.

The extraction of the spent cartridge A is performed as follows: the recoil movement of the breech block 3 produces through the extractor 31 a recoil movement of the cartridge as illustrated in Fig. 31 and it ejects the latter and causes it to rock sideways through the port 13 formed in the receiver 2 when the peripheral rim on the ejected cartridge head abuts against the stop 23 secured to the receiver as illustrated in Fig. 32. At the moment of the recoil movement of the gun, the inertia of the cartridges B contained inside the magazine 8 prevents their movement in space and the tip 71 of the stop member 70 is thus no longer in contacting relationship with the head of the rearmost cartridge in the magazine (Fig. 33). At the moment at which the breech block has recoiled and has released the opposite end 72 of the stop member 70 (Fig. 34), the latter, against which the first cartridge no longer bears at the moment considered, is free to rock under the action of its spring 73 and to assume a position such that the conveyor blade 40 is locked in its lower position until the recoil movement of the gun being terminated, the first cartridge B urged rearwardly by the spring 82 in the magazine moves out of the latter and enters a position above the conveyor 40 as illustrated in Figs. 34 and 35.

It should be remarked that, during this movement, only the rearmost cartridge which is thus urged rearwardly can move out of the magazine B since, when it has almost completely left the latter, the rim on its head urges the rear end of the stop member, the rocking of which prevents any movement of the second cartridge (Fig. 36) which is now held fast by the tip 71 of the stop member.

At the end of the recoil movement of the breech block 3, the nose 46 on the rocking member 44 subjected to the thrust exerted by the spring 41 has engaged the front notch 37a in said breech block (Fig. 35).

Thus, at the moment at which the breech block 3 moves again forwardly under the action of its springs 34, the above mentioned nose 46 of the rocking member 44 meets the solid section 37 on the breech block 3 so that said rocking member 44 rocks and through its nose 45 engaging the notch 43 on the conveyor has a tendency to make the conveyor blade rock upwardly which upward movement can furthermore be obtained only when the cartridge B has been properly positioned on the conveyor 40 and has caused the stop member 70 to rock so as to release the conveyor.

The conveyor being thus shifted enters a position in registery with the barrel 9 (Fig. 37). The conveyor 40 remains in its raised position throughout the period during which the nose 46 of the rocking member 44 is in contact with the solid section 37 of the block 3. During this time, the breech block has sufficiently progressed for the cartridge B to be fitted in the barrel 9 (Fig. 38).

As soon as said solid section 37 escapes the rocking member 44 at the end of the return movement of the breech block 3, the nose 46 engages the rear notch 37b on the breech block. The cartridge conveyor 40 is released and returns into its starting operation under the action of its spring 41 (Fig. 38). As it continues its return movement towards the front of the gun under the action of its springs 34, the breech block finishes introducing the cartridge into the barrl 9.

In the case where the cartridge entering the breech block is deformed, for instance if it has swollen under the action of moisture, it does not enter the barrel completely under the sole action of the thrust exerted on the cartridge by the springs 34 of the breech block and the latter cannot completely return into position, nor can the intermediate bolt 54. The breech block can therefore not be locked but this does not constitute a drawback since at the moment of its action on the trigger 6, the hammer 47 is actually released, but it is stopped in its travel by said intermediate bolt 54 so that it cannot hit the striker 25 (Fig. 39).

When no ammunition is carried inside the magazine, the stop member 70 is free to pivot under the action of its spring 73 and when the breech block is urged rearwardly through operation of its lever 4, said stop member progresses outwardly of its recess 20 and is positioned above the conveyor 40 which is thus locked in position. Consequently the conveyor 40 being connected with the breech block through the agency of an engagement at 43—45 with the rocking member 44, said breech block is also held fast in its recoil position. In contradistinction, when a cartridge has been actually carried inside the gun magazine and appears at the outlet of the latter, said cartridge is urged out of the magazine by the spring 82 as illustrated in Fig. 43 and the rim of its head engages the nose 71 on the stop member 70 which assumes the position illustrated in Fig. 26. Thus, the stop member is no longer capable of freely rocking under the action of the spring 73. This holding fast of the stop member distinguishes from the condition prevailing when there is no cartridge in the magazine and consequently the stop member is capable of rocking.

When a cartridge has been positioned inside the receiver, it is sufficient to urge the push-member 5 inwardly by hand so as to make the stop member 70 collapse inside its recess 20 in the receiver, which releases the conveyor 40 and consequently the rocking member 44 which allows the breech block to occupy its closing position under the action of its springs 34.

When positioning the cartridge inside the receiver, it is not necessary to attempt to position it accurately and to introduce it inside the chamber facing the barrel 9, since these operations are performed automatically through a raising of the conveyor, which raising is performed by the solid section 37 of the breech block acting on the nose 46 and consequently on said conveyor by reason of the interengagement at 43—45 (Fig. 37).

When the gun is not loaded and is uncocked through action on the trigger 6 so as to avoid keeping the springs tensioned, the breech block 3 is locked by the hammer 47 and the intermediate bolt 54 (Fig. 22). In order to allow a shifting of the breech block towards the rear of the gun when it is desired to load and cock the gun, it is sufficient to act on the lever 4 the sliding of which causes the rod 28 to project to the rear of the breech block 3 whereby the hammer 47 is urged back and thus releases the breech block which is in its turn carried along as soon as the rod 28 has entered its terminal position at the end of its sliding movement (Figs. 23 and 24).

For loading the magazine 8, it is necessary to set the breech block in its battery position (Fig. 26) and it is then sufficient to introduce the cartridges through the lower opening 12 in the receiver 2 while the conveyor 40 is rocked upwardly so as to uncover the entrance into the magazine. It should be first remarked that when the breech block is in its battery position, the tip 72 of the stop member is projected upwardly as shown in Fig. 26 out of the path of the breech block, so that the stop member is collapsed within its recess and allows a rocking of the conveyor 40 located underneath the breech block 3 (Fig. 27). This rocking by hand of said conveyor 40 releases, as described, the opening of the magazine and cartridges may be entered into the latter in spite of the partial elastic hindrance produced by the opposite end 71 of the stop member which projects slightly into registry with the opening of the magazine. It will be remarked that the passage of the rim on the head of the cartridge in registry with the tip 71 of the stop member is obtained through a transient elastic deformation of said stop member as illustrated in Fig. 25. When it is desired to remove out of the magazine the cartridges which have not been used, it is sufficient to urge aside with one's finger the front end or tip of the stop member so as to make it collapse inside its housing through an elastic deformation thereof without it being necessary to shift the breech block for removing each cartridge.

It should also be remarked that the sliding of the breech block 3 is executed over the small rail 14 which serves as a slideway and is fitted inside the receiver 2.

Since none of the members of the mechanism extends beyond and outside the receiver 2, the latter may be fitted according to a novel feature of my invention in a removable manner over the butt 1 without the latter being weakened by bores or recesses. This fitting of the receiver is obtained as shown in Fig. 41 through the agency of a metal plate 75 secured through wood screws 76 to the front surface of the butt 1. This metal plate is provided with a nut 77 passing through it and the rear end of which forms a shoulder in the plate, said nut being prevented from rotating by a transverse set screw 78. The threaded plug 21 rigid with the receiver 2 may thus be screwed into the nut 77 until the rear surface of said receiver engages tightly the plate 75. The set screw 77 and also possibly the set screw 22 allow the cooperating nut and/or threaded plug to rock slightly so as to obtain the desired adjustment corresponding to the intimate engagement between the receiver 2 and the plate 5 when they are properly aligned with each other. A projection engaging a notch under the action of a spring and which is not illustrated in the drawings is provided for this alignment. This manner of mounting the butt allows furthermore removing easily and speedily the butt from the remainder of the gun so as to reduce its longitudinal bulk during transportation.

An arrangement is also provided for indicating the number of cartridges in the magazine at any moment. This magazine 8 includes to this end and as illustrated in Fig. 43, in addition to its piston 81 and to its spring 82 a small piston 83 of which one surface is subjected to the pressure of the spring 82 and the other to the pressure of an antagonistic spring 84. Said piston 83 is provided with a scale carrying rod 85 passing through the outer plug 86 out of the magazine. The power of the spring 84 is selected so as to balance that of the spring 82 whenever the magazine contains no cartridge and consequently to make then the tip of the rod 85 flush with the plug 86. If a cartridge is urged into the magazine, the spring 82 is compressed and compresses in its turn the spring 84 through the agency of the piston 83. The rod 85 projects thus beyond the plug 86 by the value of one scale subdivision on said rod. When a second cartridge is urged into the magazine, the same procedure is repeated and the rod projects by one further subdivision beyond the plug 86. The reverse procedure is obtained when the cartridges are removed out of the magazine either automatically or by hand. It is therefore sufficient to count the number of subdivisions apparent on the outside of the plug 86 to obtain immediately the number of cartridges positioned or remaining in the magazine.

Lastly, it is obvious as already mentioned that my invention is by no means limited to the sole embodiment described hereinabove and illustrated in the accompanying drawings and it covers all the modifications thereof falling within the scope of the accompanying claims.

What I claim is:

1. In a firearm for firing a series of cartridges, the combination of a receiver adapted to house a cartridge in its front end portion, a barrel rigidly secured to the front end of the receiver, a breech block slidably carried in the receiver and adapted to move between a rear and front position to shift a cartridge out of its housed position in the receiver into the barrel, a striker slidably extending through the breech block and adapted to move towards the cartridge for firing the same when said cartridge is positioned in the barrel, a spring urging the striker rearwardly with reference to the breech block, a transverse spindle mounted in the receiver, a trigger mounted on said spindle to pivot between an operative and an inoperative position, an inertia block freely engaging the rear end of the receiver and having a notch in its forward end portion encompassing said trigger, a spring interposed between the body of the inertia block and the trigger to normally hold the latter in its inoperative position, a second transverse spindle pivotally mounted in the receiver with its axis parallel to the pivotal axis of the trigger, a hammer mounted on said second spindle, means carried by said trigger and said hammer for latching the latter in cocked position, a spring urging the hammer into its operative position, a third spindle pivotally secured to the receiver in parallel relation to the pivotal axes of the hammer and of the trigger, a sear mounted on said third spindle and adapted to pivot between an inoperative and an operative position wherein it is engaged by the breech block in the forward position of the latter and abuts the hammer when the latter is released, whereby said hammer, sear, and breech block recoil in unison with the receiver upon firing of the cartridge, a spring urging the sear into its breech block-engaging position, an extension on the hammer positioned forwardly of the forward end of the inertia block and engageable by said inertia block at the end of the relative forward movement of said inertia block whereby the hammer rotates from its operative position into its trigger-engaged position thus disengaging the sear and thereby releasing the breech block for rearward movement, and spring means urging the breech block forwardly.

2. In a firearm for firing a series of cartridges, the combination of a receiver adapted to house a cartridge in its front end portion, a barrel rigidly secured to the front end of the receiver, a slideway in the upper portion of the receiver, a breech block slidably carried in said slideway and adapted to move between a rear and a front position to shift a cartridge out of its housed position in the receiver into the barrel, a striker slidably extending through the breech block and adapted to move toward the cartridge for firing the same when said cartridge is positioned in the barrel, a spring urging the striker rearwardly with reference to the breech block, a transverse spindle mounted in the receiver, a trigger mounted on said spindle to pivot between an operative and an inoperative position, an inertia block freely engaging the rear end of the receiver and having a notch in the forward portion encompassing said trigger, a spring interposed between the body of the inertia block and the trigger to normally hold the latter in its inoperative position, a second transverse spindle pivotally mounted in the receiver with its axis parallel with the pivotal axis of the trigger, a hammer mounted on said second spindle, means carried by said trigger and said hammer for latching the latter in cocked position, a spring urging the hammer into its operative position, a third spindle pivotally secured to the receiver in parallel relation to the pivotal axes of the hammer and of the trigger, a sear mounted on said third spindle and adapted to pivot between an inoperative and an operative position wherein it is engaged by the breech block in the forward position of the latter and abuts the hammer when the hammer is released whereby said hammer, sear and breech block recoil in unison with the receiver upon firing of the cartridge, a spring urging the sear into its breech block-engaging position, an extension on the hammer positioned forwardly of the forward end of the inertia block and engageable by said inertia block at the end of the relative forward movement of said inertia block whereby the hammer rotates from its operative position into its trigger-engaged position thus disengaging the sear and thereby releasing the breech block for rearward movement, and spring means urging the breech block forwardly.

3. In a firearm for firing a series of cartridges, the combination of a receiver adapted to house a cartridge in its front end portion, a barrel rigidly secured to the front end of the receiver, a breech block slidably carried in the receiver and adapted to move between a rear and a front position to shift a cartridge out of its housed position in the receiver into the barrel, a striker slidably extending through the breech block and adapted to move toward the cartridge for firing the same when said cartridge is positioned in the barrel, a spring urging the striker rearwardly with reference to the breech block, a trigger having an oval opening extending transversely therethrough, a transverse spindle mounted in the receiver and extending through said oval opening thereby allowing said trigger to pivot between an operative and an inoperative position in said receiver, an inertia block freely engaging the rear end of the receiver and having a notch in its forward end portion encompassing said trigger, a spring interposed between the body of the inertia block and the trigger to normally hold the latter in its inoperative position, a second transverse spindle pivotally mounted in the receiver with its axis parallel with the pivotal axis of the trigger, a hammer mounted on said second spindle, means carried by said trigger and said hammer for latching the latter in cocked position, a spring urging the hammer into its operative position, a third spindle pivotally secured to the receiver in parallel relation to the pivotal axes of the hammer and of the trigger, a sear mounted on said third spindle and adapted to pivot between an inoperative and an operative position whereby it is engaged by the breech block in the forward position of the latter and abuts the hammer when the latter is released whereby said hammer, sear and breech block recoil in unison with the receiver upon firing of the cartridge, a spring urging the sear into its breech block-engaging position, an extension on the hammer positioned forwardly of the forward end of the inertia block and engageable by said inertia block at the end of the relative forward movement of said inertia block whereby the hammer rotates from its operative position into its trigger-engaged position thus disengaging the sear and thereby releasing the breech block for rearward movement, and spring means urging the breech block forwardly.

References Cited in the file of this patent

UNITED STATES PATENTS

| | | |
|---|---|---|
| 659,507 | Browning | Oct. 9, 1900 |
| 2,288,901 | Green | July 7, 1942 |
| 2,499,090 | Browning | Feb. 28, 1950 |
| 2,570,772 | Crittendon | Oct. 9, 1951 |
| 2,622,359 | Belleri | Dec. 23, 1952 |
| 2,704,491 | Prola et al. | Mar. 22, 1955 |